United States Patent [19]

Brajkovich

[11] 3,785,517

[45] Jan. 15, 1974

[54] MOTORCYCLE CARRIER AND CHOCK

[76] Inventor: William D. Brajkovich, 4150 Del Curto Dr., Reno, Nev. 89503

[22] Filed: Sept. 30, 1971

[21] Appl. No.: 185,296

[52] U.S. Cl.................. 214/450, 211/22, 248/121, 280/402
[51] Int. Cl............................................. B60r 9/10
[58] Field of Search.................. 211/17, 20, 22, 23, 211/24; 248/121, 119 R; 224/29 R, 42.32, 42.42 R, 42.45 R; 280/402, 292; 218/450

[56] References Cited
UNITED STATES PATENTS

| | | | |
|---|---|---|---|
| 3,430,983 | 3/1969 | Jones | 280/402 |
| 458,974 | 9/1891 | Merrill | 211/20 |
| 3,223,251 | 12/1965 | Rothe et al. | 187/8.5 X |
| 2,437,811 | 3/1948 | Folden | 214/334 |
| 3,542,157 | 11/1970 | Noah | 188/32 |
| 3,687,318 | 8/1972 | Casey | 214/450 |

Primary Examiner—Gerald M. Forlenza
Assistant Examiner—Jerold M. Forsberg

[57] ABSTRACT

A sturdy light weight means for holding a motorcycle in upright rigid position during transportation in a truck, trailer, and the like which includes a base plate secured in the truck or trailer upon which a curved channel is pivotly mounted. The channel suitably receives the size and shape of the front wheel of a motorcycle and extends in supporting contact for not less than 180°. At the entry end of this channel there is a reverse curved channel integral and continuous therewith. This channel structure is pivotly mounted offset from its mid point, on the base for pivoting in a vertical plane. When the front wheel of the motorcycle is pushed into the entry channel and rides over the hump, the weight of the motorcycle wheel in the channel causes the channel to swing about the offset pivot and rock forward to securely hold the motorcycle wheel, with contact over 180°. The reverse curve of the entry end of the channel bears against the main frame of the motorcycle and prevents any lateral movement while the front wheel is so engaged. There is a pivoted chock plate mounted underneath the channel rearwardly of the pivot for the channel, which does not come into engagement with the transverse ridges of the base plate unless and until the motorcycle wheel is in its holding position within the channel. The chock plate is moved in an upward arc to disengage the same and permit the removal of the motorcycle from its holder.

2 Claims, 5 Drawing Figures

PATENTED JAN 15 1974　　3,785,517
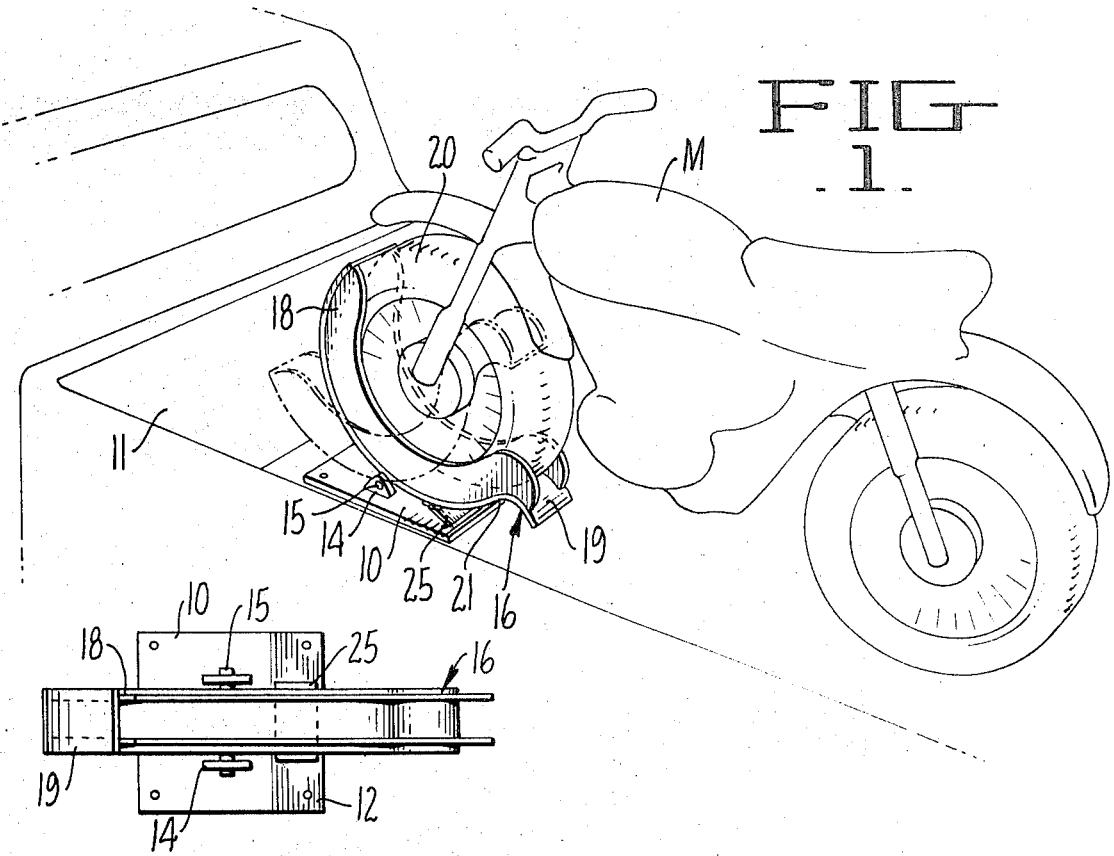
FIG. 1.
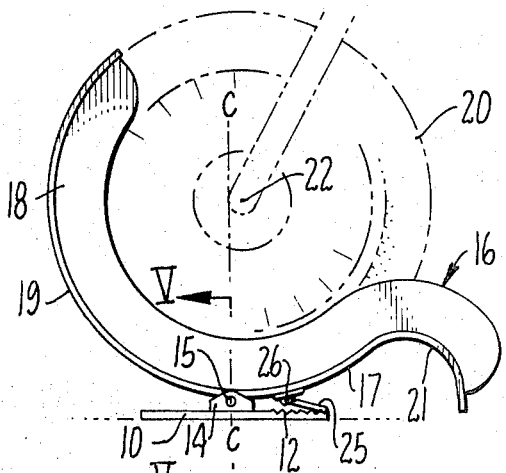
FIG. 2.
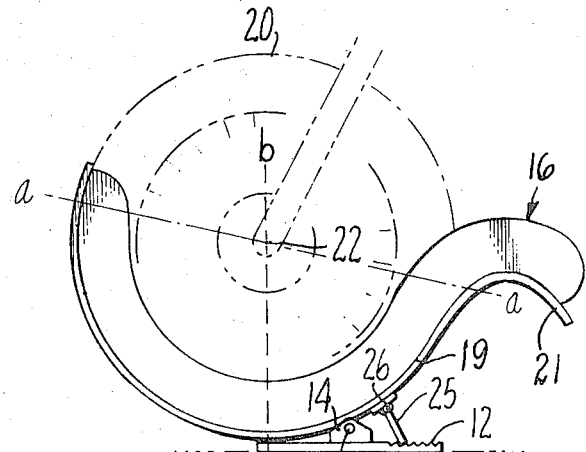
FIG. 3.
FIG. 4.
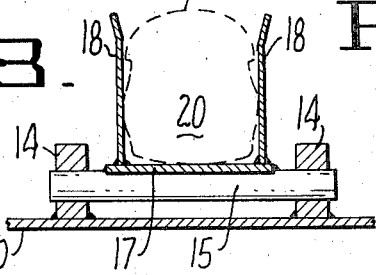
FIG. 5.
INVENTOR.
WILLIAM D. BRAJKOVICH
BY
Henry Gifford Hardy
ATTORNEY

1

MOTORCYCLE CARRIER AND CHOCK

BACKGROUND OF THE INVENTION

With the great popularity of motorcycle use in the past decade and with the greatly increased traffic of motor vehicles on the highways, there developed a great need to transport motorcycles to meets and places for pleasure use, by means of pickup trucks, trailers and the like. All kinds of make-shift holders, tie-downs and the like have been tried, all with some modicum of success, but none with the real simplicity and inexpensive means which are minimumly required.

Most of the prior art has developed from the old-fashioned bicycle stands which were completely satisfactory for bicycles, but which are not satisfactory support for the heavier and more substantial motorcycles. No structure is known which in any way discloses the structure and characteristics of the invention described herein.

SUMMARY OF THE INVENTION

The structure of the invention is given in summary in the abstract above and this structure provides many advantages. One person can load and unload a motorcycle in a truck or on a trailer without assistance, using the present structure. Furthermore it is done more quickly and better, and this is important especially at meets where there are literally hundreds of motorcycle enthusiasts. By staggering these motorcycle carriers for handlebar clearance, three motorcycles can be placed easily in the bed of a pickup truck or trailer because each takes up very little room and does not have tie-downs or other elaborate guides for holding the motorcycle in position during transportation. It is economical because the structure is completely simplified, it has no maintenance and substantially nothing to wear out. It also provides a frame holder by shaping the entrance channel which keeps the rear wheel of the motorcycle from drifting sideways during transportation or parking.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawing, and while there is shown therein a preferred embodiment thereof, it is to be understood that the same is illustrative of the invention and that the invention is capable of modification and change and comprehends other details of construction without departing from the spirit thereof or the scope of the appended claims.

BRIEF DESCRIPTION OF THE DRAWING

FIG. 1 is a perspective view showing the motorcycle carrier assembly mounted in the bed of a pickup truck with the motorcycle just entering the carrier through the reverse curve entry of the channel. The holding position of the carrier is also shown in the broken lines;

FIG. 2 is a plan view of the carrier and chock in the position ready for entry;

FIG. 3 shows the position of the carrier channel in the entry position with the motorcycle wheel shown in broken lines;

FIG. 4 is an elevational view of the carrier in the holding position with the front wheel shown in broken lines; and FIG. 5 is a transverse enlarged view taken on the line V — V of FIG. 3.

DESCRIPTION OF THE PREFERRED EMBODIMENTS

Referring now more particularly to the drawing in which like numerals represent like parts in the several views, and with special reference to FIGS. 1, 2 and 5, the entire carrier structure is mounted on a base plate 10. The base plate 10 is secured in any suitable manner to the floor of a pickup truck 11, to the floor of a suitable trailer (not shown) or the like, for rigid holding. The base plate 10 has transverse ridges 12 rearwardly of the pivot point, the purpose of which will be explained later. Also secured to the base plate 10 are two longitudinal upstanding ears 14 which are the journals and bearings for the transverse rotating pivot pin 15. The height of the pivot 15 above the plate 10 may be varied to obtain the optimum holding.

The main holder for the wheel is a sheath like channel generally designated 16. This channel can either be curved in section or substantially square in section as shown in FIG. 5, depending upon the method of fabrication. As shown in the drawing it is fabricated by a curved piece of metal 19 shaped to follow the contour of the maximum diameter of the front wheel tire. Secured thereto at either side are walls 18 which bear against the tire 20 and the rim 29. Whatever the shape of the channel 16 it is to be noted from the several figures, and particularly FIG. 4, that when the motorbike wheel is engaged within the channel 16 it has a continuous bearing on the tire at its maximum diameter and at the side for one hundred and eighty degrees or more.

It will be observed that at the entry end of the channel 16 there is a reverse curve 21. This is quite a sharp turn and is a hump which must be overcome to place the wheel of the motorcycle in the channel 16 as shown particularly in FIG. 2. The position shown in FIG. 2 is substantially that shown in FIG. 1 in solid lines. In this position, the wheel has entered the channel and is in the gripping or retaining position. It is to be noted that the vertical diameter of the wheel as indicated by its center point 22 is slightly behind the vertical diameter as extended by the line $c - c$ in FIG. 2. It takes only a small exertion of force to move the motorcycle forward, and this rocks the channel 16 on its pivot 15 to the holding position as shown in FIG. 4. Because of the variations in frames, the reverse curve 21 is eliminated. This is done without restricting the usefulness of the carrier and its purposes.

In the holding position, it will be observed, that the pivot pin 15 which is rigidly attached to the underside of the channel 16 permits the channel to rotate forwardly downwardly approximately 80° to the position shown in FIG. 4. In this position the channel 16 at its lowermost point is below the transverse axis of the pivot pin 15. The center of the wheel, designated by the numeral 22, and its vertical diameter $b - b$ is now well forward of the pivot pin 15 and represents the lowermost point of the channel 16. In this position also, as shown by FIGS. 1 and 4, the reverse curve channel portion 21 bears against the main frame behind the front wheel of the motorcycle and steadies the frame in direct alignment with the holding of the front wheel. In some instances this reverse entry curve may be modified or eliminated, but this is not the preferable form.

While it is true that the forward holding position shown in FIG. 4 locks the motorcycle in the holding position, as an abundance of caution there is a chock plate number 25 which is pivotly mounted on the under surface of the channel 16 by pivot 26. It will be observed that as the motorcycle is moved forward in its channel, from the position shown in FIG. 2 to the position shown in FIG. 4, the chock plate 25 drops down and its lowermost edge engages in the transverse ridges 12 of the main plate 10. This effectively locks the holding of the motorcycle in the locked position against any jolt or inertia which would loosen its position or cause it to move rearwardly.

OPERATION

The motorcycle M of FIG. 1 is rolled into position on the truck or other carrier with its front wheel aligned with the reverse curve 21 of the channel 16. The motorcycle front wheel is bumped over the hump formed by the reverse curve 21 so that the front wheel enters the channel 16 to the position shown in FIG. 2. This is shown in the solid lines and is also shown in FIG. 1. Further forward movement of the motorcycle causes the channel to pivot counter clockwise on its pivot 15 to the holding position as shown in FIG. 4, and in broken lines in FIG. 1. In this position the chock plate 25 drops downwardly on its pivot 26 so that its lowermost edge engages in the ridges 12 of the base plate 10. Also the reverse curve 21 engages the main frame of the motorcycle M to prevent the rear wheel from drifting sideways when the motorcycle is in the locked holding position shown in FIG. 4.

The reason for the one hundred eighty degree plus holding in the channel 16 is to prevent any undue stress or strain on either the tire or rim during the holding period. The weight of the motorcycle M is such that if during a transport there is any lateral shift or twist there is apt to be twisting or misalignment of the spokes of the front wheel. This would result in a situation which is extremely dangerous and particularly so if any racing is involved. The 180° bearing in a vertical as well as a transverse plane assures a safe and undistorted holding which cannot be accomplished by a holding at two or more points.

I claim:

1. A motorcycle transport holder in combination, a longitudinally curved channel holder adapted to receive the volume of the front wheel rim and tire of a motorcycle for independently supporting the same continuously over not less than 180° of its circumference, said holder having an entry end, a mounting plate for said holder, and a transverse pivot supported on said plate and mounted externally on said holder channel at a point less than 90° from the entry end permitting the holder to pivot forward in a vertical plane to an over-center holding position, said entry end being a reverse downward curve beyond and rearwardly of the 180° holding portion and continuous therewith, which entry portion in the over-center holding position is adapted to bear against a portion of the motorcycle other than the front wheel to prevent any side to side drift or turning.

2. A motorcycle transport holder in combination, a longitudinally curved channel holder shaped to fit the full volume of the front wheel rim and tire of a motorcycle in continuous independent supporting engagement for not less than 180° in the upright position, a plate having transverse grooves on its upper surface adapted for fixed securing to the bed of a transport vehicle, a transport vehicle having a bed, transverse pivot means secured to the exterior of said channel rearwardly of its mid point and journalled on said plate, chock locking means pivotally mounted externally on said channel rearward of said pivot means engaging in said transverse grooves locking the channel in an over-center holding position, said channel having a rearwardly continuous downwardly directed reverse curve entry portion, said reverse curve entry portion being adapted to bear against a portion of a motorcycle other than the front wheel, in the over-center holding position to prevent side to side drifting or turning.

* * * * *